(12) United States Patent
Aymar

(10) Patent No.: US 11,518,463 B2
(45) Date of Patent: Dec. 6, 2022

(54) BICYCLE STEM WITH INTEGRATED BELL

(71) Applicant: Brandon P. Aymar, Santee, CA (US)

(72) Inventor: Brandon P. Aymar, Santee, CA (US)

( * ) Notice: Subject to any disclaimer, the term of this patent is extended or adjusted under 35 U.S.C. 154(b) by 912 days.

(21) Appl. No.: 16/378,445

(22) Filed: Apr. 8, 2019

(65) Prior Publication Data

US 2020/0317284 A1 Oct. 8, 2020

(51) Int. Cl.
  *B62J 3/00* (2020.01)
  *B62K 21/18* (2006.01)
  *B62J 6/00* (2020.01)
  *G10K 1/072* (2006.01)
  *B62J 99/00* (2020.01)
  *B62J 45/10* (2020.01)

(52) U.S. Cl.
  CPC . *B62J 3/00* (2013.01); *B62J 6/00* (2013.01); *B62J 99/00* (2013.01); *B62K 21/18* (2013.01); *G10K 1/072* (2013.01); *B62J 45/10* (2020.02)

(58) Field of Classification Search
  CPC ....... B62J 3/00; B62J 6/00; B62J 99/00; B62J 45/10; B62K 21/18; G10K 1/072
  See application file for complete search history.

(56) References Cited

FOREIGN PATENT DOCUMENTS

CN          2111911 U    *  1/1991
CN       102765458 A    * 11/2012

* cited by examiner

*Primary Examiner* — Adam M Alharbi
(74) *Attorney, Agent, or Firm* — Richard D. Clarke

(57) ABSTRACT

The present application is directed to a Bicycle Stem with Integrated Bell that mounts between the steering post and the handle bars. It incorporates a utility accessory mount for attaching a front light, a camera or other devices that can be easily removed. In addition, it will have an internal cavity where a gravity and motion activated conventional bell that can ring using a magnetic on/off option or a mechanical on/off capability. The internal cavity may additionally house an electronic component with a bell or siren having a continuous sound or when the cyclist presses the on/off switch or an intermittent audible sound control button.

20 Claims, 9 Drawing Sheets

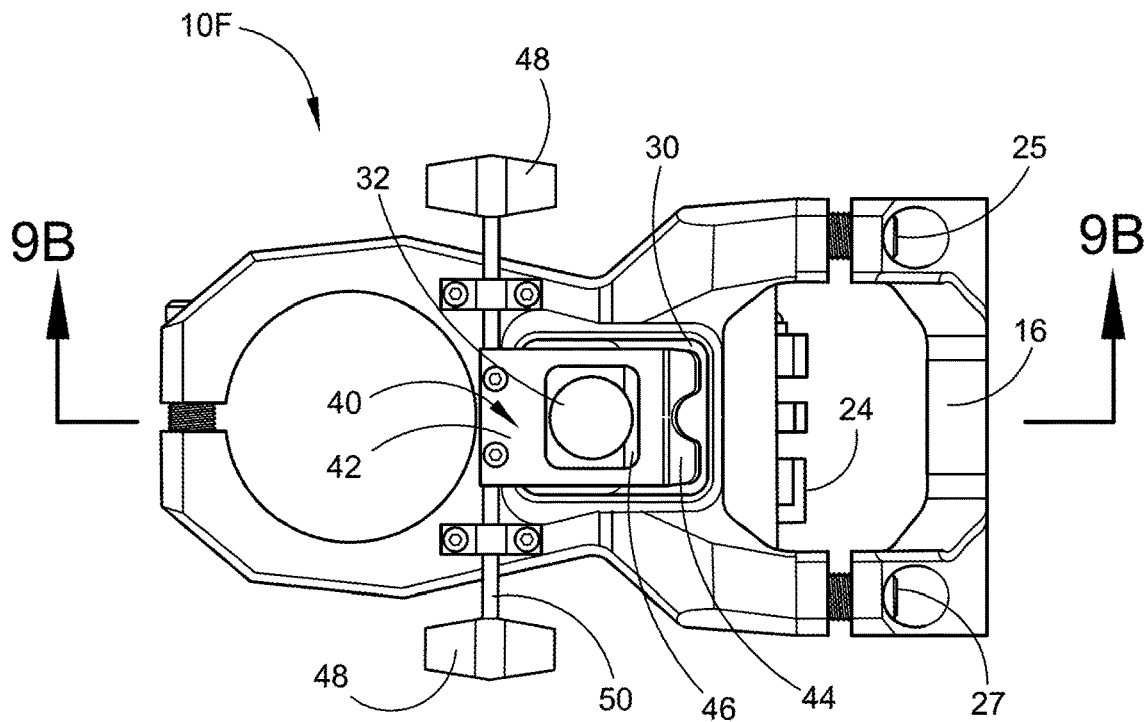
FIG. 9A
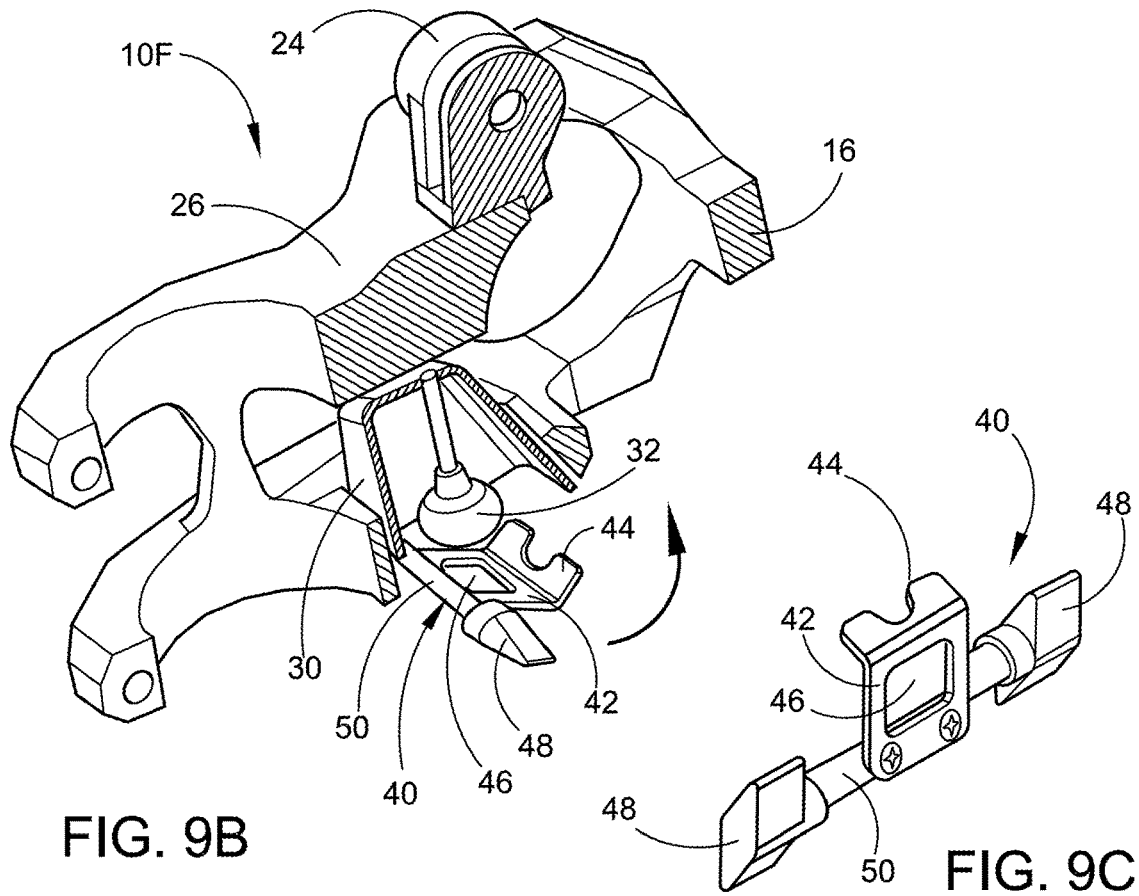
FIG. 9B
FIG. 9C

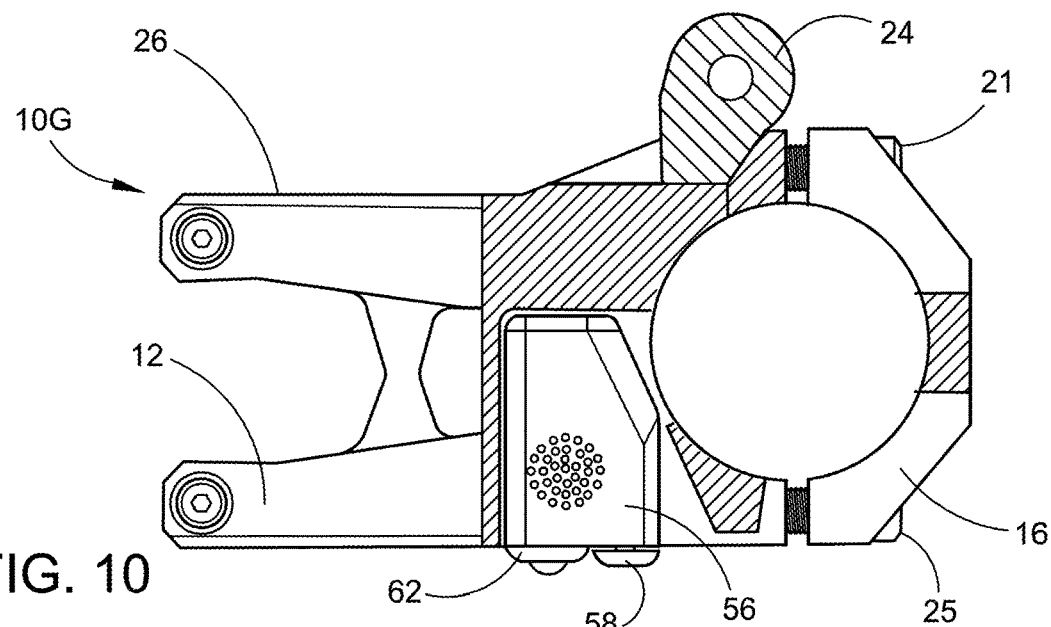
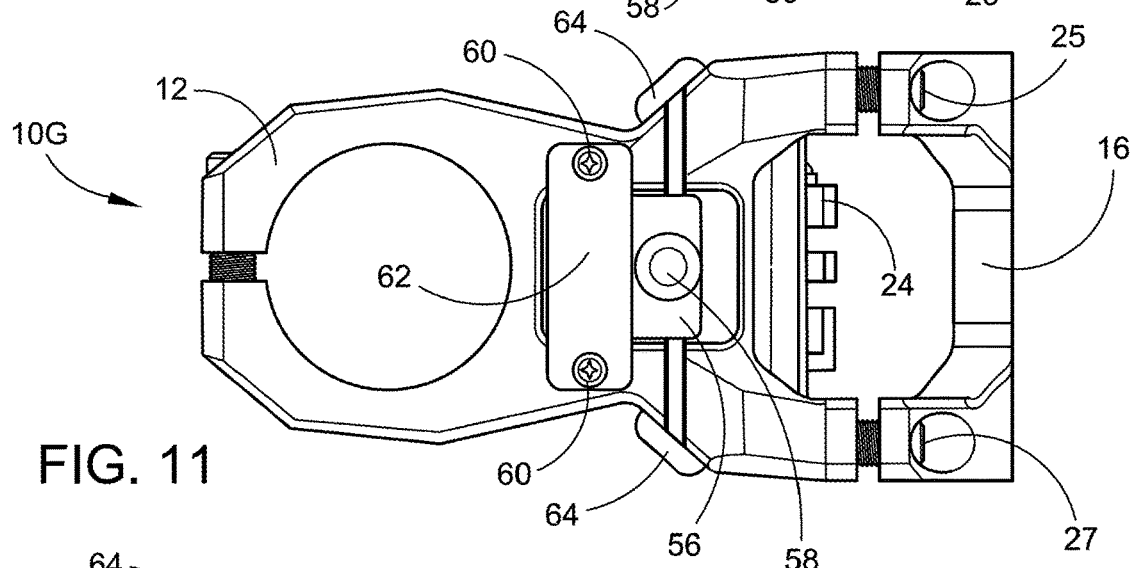
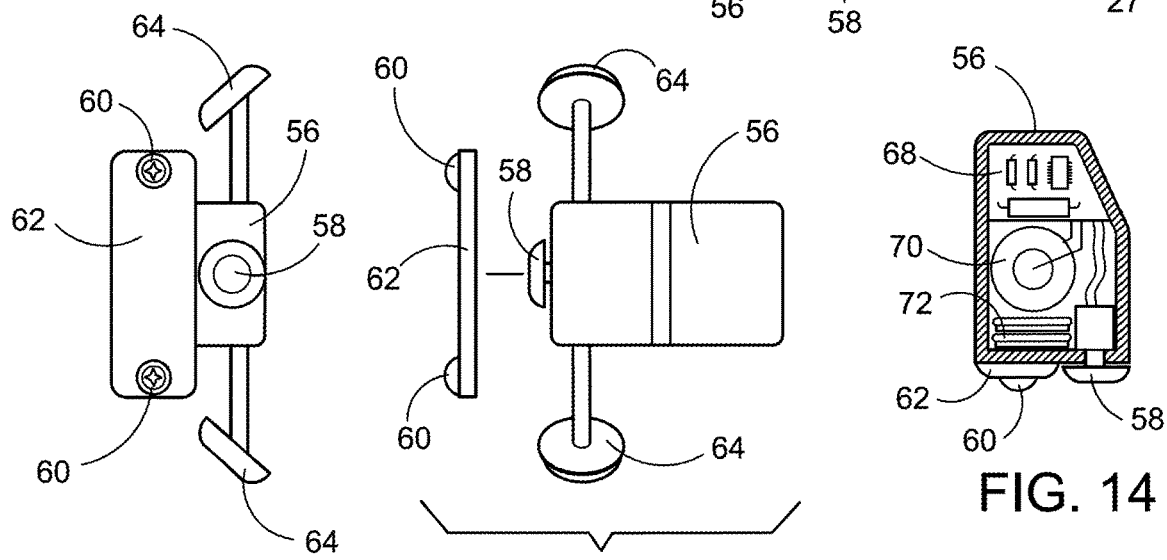

BICYCLE STEM WITH INTEGRATED BELL

FIELD OF THE INVENTION

This application relates to a Bicycle Stem with Integrated Bell. More particularly this bicycle stem offers a utility mount capability of attaching a front light, a camera or other devices that can be easily removed by the individual using the bicycle. In addition, it will have an internal cavity where a gravity and motion activated conventional bell with a magnetic on/off capability or a mechanical on/off capability is attached. The internal cavity may additionally house an electronic battery-operated component with a bell or siren having a continuous sound capability or when the cyclist presses a button, on/off/or intermittent control.

BACKGROUND OF THE INVENTION

Individuals riding a variety of styles and sizes of bicycles are often called cyclists and when they ride in areas with other cyclists it often becomes congested where riders can be going in different directions and at different speeds. In these congested situations bicycle bells have been used on bicycles for a great many years. Often these cyclists are young or just learning how to ride a bicycle. In most applications the bicycle bell is operated by the rider manually and may distract unexperienced operators from what they should be doing. These conventional bells are only used on demand by the rider and do not ring continually as the rider is operating the bicycle. This is where the capability of the Bicycle Stem with Integrated Bell will be a great asset, letting other riders be aware of the person riding the bicycle is located. With the great quantities of people riding bicycles in many countries, there needs to be changes made in the design and operation of the bicycle bells, and this is where the Bicycle Stem with Integrated Bell will solve the problem.

In this respect, before explaining at least one embodiment of the Bicycle Stem with Integrated Bell in greater detail, it is to be understood that the design is not limited in its application to the details of construction and to the arrangement of the components set forth in the following description or illustrated in the drawings. The Bicycle Stem with Integrated Bell is capable of other embodiments and of being practiced and carried out in various ways. Also, it is to be understood that the phraseology and terminology employed herein are for the purpose of description and should not be regarded as limiting.

Numerous innovations for the bicycle bells have been provided in the prior art that are described as follows. Even though these innovations may be suitable for the specific individual purposes to which they address, they differ from the present design as hereinafter contrasted. The following is a summary of those prior art patents most relevant to this application at hand, as well as a description outlining the difference between the features of the Bicycle Stem with Integrated Bell and the prior art.

U.S. Pat. No. 6,981,413 of Osamu Kinoshita describes a handle stem attached to a head tube of a bicycle includes a speed indicator housed in an indicator housing. The indicator is formed of a body including a circuit board and a liquid-crystal display and a battery housing which is detachable from the body. The body is fixed to the indicator housing and accordingly the speed indicator is attached to the handle stem and the battery housing is freely attachable/detachable. The handle stem and the speed indicator are thus obtained with which batteries are easily replaced without detaching the whole of the indicator from the handle stem.

This patent describes a handle bar stem attached to a head tube of a bicycle that includes an electronic speed indicator housed within, but only has the single feature and does not have the sounding of a bell or siren when the bicycle is ridden to warn other riders of the riders present.

U.S. Pat. No. 9,240,175 of Christopher Wyche describes a device and method that provides an alerting bell that can be quickly and easily disabled when desired. The bell includes a knocker portion inside a cylindrical body that is spring loaded so that it can be pulled below the bottom rim of the cylindrical body of the bell. The knocker portion and the bottom rim of the bell are modified so that the bottom portion of the knocker portion can be securely affixed to the rim of the cylindrical main body as needed to turn off the alerting function of the bell as desired.

This patent describes a conventional bell that can be quickly and easily attached to the handlebar and disabled when desired with only a unique method of silencing the sound. This device simply attaches to any part of the bicycle like the bells have for many years but it is not a permanent structural component with the features of the Bicycle Stem with Integrated Bell.

US Patent Application Publication No. US 2017/0057580 A1 of David Bryant Snaith describes an audible warning device for a bicycle including a steerer column. The audible warning device comprises one or more sound generating components; a housing adapted to house at least one of the one or more sound generating components; and a mounting component for securing the housing to the steerer.

This patent describes an audible warning device adapted to house at least one or more sound generating components mounted in the housing of the steering post but it is not a complete multipurpose structural member and does not offer the capabilities of the Bicycle Stem with Integrated Bell, or the removable utility mount for a light, camera or other devices.

U.S. Pat. No. 9,633,643 of Chris Bilanenko et al. describes a device and method that provides an alerting bell that, can be quickly and easily be disabled when desired. The bell includes a knocker portion inside a cylindrical body that is spring loaded so that it can be pulled below the bottom rim of the cylindrical body of the bell. The knocker portion and the bottom rim of the bell are modified so that the bottom portion of the knocker portion can be securely affixed to the rim of the cylindrical main body as needed to turn off the alerting function of the bell as required.

This patent describes an alerting bell that can be quickly and easily disabled when desired and securely affixed to the rim of the cylindrical main body of the bicycle, but is not a structural member of the bicycle as the Bicycle Stem with Integrated Bell and does not offer the unique features that have been described.

U.S. Pat. No. 9,139,244 of Frank Anthony Ierfone describes a handgrip assembly including a sound emitting assembly, the handgrip assembly adapted to be slid over and into a tube end at an end portion of a tubular handlebar.

This patent describes a handgrip assembly including a sound emitting assembly to be slid over the end portion of a tubular handlebar, but it is not a structural member of the bicycle with the additional features offered by the Bicycle Stem with Integrated Bell.

U.S. Pat. No. 7,806,071 of Szu-Fang Tsai describes a bicycle bell including a housing mounted on a handlebar and comprising a channel and an upward extending flange partially surrounding a top of the channel; a guide member secured to the housing; a drum secured to and covered the guide member; and a spring biased striking device mounted on the channel and comprising a bell lever and an opposite clapper extending through the flange to contact the guide member. Pivoting the bell lever about the channel will pivotably move the clapper to strike a first position on the drum after passing the guide member. Releasing the bell lever will return the clapper to its inoperative position after passing the guide member and striking an opposite second position on the drum. The bell is easy to manipulate with the same hand squeezing the brake lever.

This patent describes a bicycle bell that includes a housing mounted on a handlebar brake member, but it is not a structural member of the bicycle and does not have the additional features offered by the Bicycle Stem with Integrated Bell.

U.S. Pat. No. 7,424,863 of Szu-Fang Tsai describes a bell mounted in one of at least one brake lever of a bicycle is disclosed. The brake lever includes two brake levers each including an opening section. In one embodiment, the bell includes a sounding section in the opening section and including a hollow cylinder, an annular flange having one open end in communication with inside of the cylinder, a first spring biased between an inner wall of the brake lever and the cylinder with the flange disposed therein, a second spring in the cylinder and having one end engaged with the end of the cylinder, and a bolt driven through the second spring, the flame, and the first spring to have one end threadedly secured in the brake lever and a head urging against the second spring; and a spring biased striking section pivotably secured onto the brake lever and including a lever and a clapper.

This patent describes a bicycle bell that includes a housing mounted on a handlebar brake member but it is not a structural member of the bicycle and does not have the additional features offered by the Bicycle Stem with Integrated Bell.

U.S. Pat. No. 5,307,756 of Kyoji Ichimura describes a bicycle bell with a finger actuated strike lever mounted on a rotating base. The rotating base can be rotated around the 360.degree. periphery of the ringer. Thus, the bell can be quickly adjusted for various riders or for switching from the right to the left handlebar. Additionally, the present invention allows the user to choose which finger to use as well as to accommodate other equipment such as bicycle levers, etc.

This patent describes a conventional bicycle bell that mounts to the handlebars, but does not have the additional features offered by the Bicycle Stem with Integrated Bell.

While the prior patents and prior art commercial devices have been successful to a certain extent, it is nonetheless clear that substantial room exists for affecting an advance in the art, which overcomes these shortcomings in a practical and efficient manner.

None of these previous efforts, however, provides the benefits attendant with the Bicycle stem with Integrated Bell. The present design achieves its intended purposes, objects and advantages over the prior art devices through a new, useful and unobvious combination of method steps and component elements, with the use of a minimum number of functioning parts, at a reasonable cost to manufacture, and by employing readily available materials.

SUMMARY OF THE INVENTION

The preferred embodiment of the Bicycle Stem with Integrated Bell is a new and unique integral part of the bicycle structure replacing the conventional bicycle stem with numerous useful capabilities for bicycle riders.

The primary advantage of Bicycle Stem with Integrated Bell is that it can be easily mounted on the steering post on a variety of different bicycles.

Another advantage of the Bicycle Stem with Integrated Bell is that it secures firmly to the handle bars on most bicycles.

Yet another advantage of the Bicycle Stem with Integrated Bell is that it has a removable utility mount with the capability of attaching a front light, a camera or other devices that can be easily removed by the individual using the bicycle.

A further advantage of the Bicycle Stem with Integrated Bell is that it has an internal cavity where the bell will be housed.

Another advantage of the Bicycle Stem with Integrated Bell is that the ringing of the bell may be turned off by the means of a magnet on a swivel that can be rotated up or down to let the clapper swing or restrain it.

Another advantage of the Bicycle Stem with Integrated Bell is that the motion of the bicycle will activate the movement of the bell clapper ringing the bell.

An advantage of the second alternate of the Bicycle Stem with Integrated Bell is the bell will have a manual on/off lever to rotate to silence the bell.

An advantage of the third alternate embodiment of the Bicycle Stem with Integrated Bell is that an electronic device can be attached within the internal cavity having a bell or siren with a continuous or intermittent sound capability or when the cyclist presses the on/off/or intermittent control button.

Another advantage of the Bicycle Stem with Integrated Bell is that LED lights can be mounted on either side of the bicycle stem connected to the electronic device.

These together with other advantages of the Bicycle Stem with Integrated Bell along with the various features of novelty, which characterize the design are pointed out with particularity in the claims annexed to and forming a part of this disclosure. For a better understanding of the Bicycle Stem with Integrated Bell its operating advantages and, the specific objects attained by its uses, reference should be made to the accompanying drawings and descriptive matter in which there are illustrated the preferred and alternate embodiments of the Bicycle Stem with Integrated Bell. There has thus been outlined, rather broadly, the more important features of the design in order that the detailed description thereof that follows may be better understood, and in order that the present contribution to the art may be better appreciated. There are additional features of the Bicycle Stem with Integrated Bell that will be described hereinafter, and which will form the subject matter of the claims appended hereto.

The preferred embodiment of the Bicycle Stem with Integrated Bell is a unique integral part of the bicycle structure having two sections for clamping to the steering post of the bicycle. An internal cavity for housing the bell assembly is adjacent to the handlebar clamping section with a removable utility mount with the capability of attaching a front light, a camera or other devices that can be easily removed by the individual using the bicycle. The ringing of the bell may be turned off by the means of a magnet, hook and loop material such as Velcro®, or the like, on a swivel that can be rotated up or down to let the clapper swing or restrain it.

The second alternate of the Bicycle Stem with an Integrated Bell will have a manual on/off lever to rotate to silence the bell.

The third alternate embodiment of the Bicycle Stem with Integrated Bell is that an electronic device can be attached within the internal cavity having a bell or siren automatically sounding capability or when the cyclist presses the control button. LED lights can be mounted on either side of the bicycle stem connected to the electronic device.

With respect to the above description then, it is to be realized that the optimum dimensional relationships for the parts of the Bicycle Stem with Integrated Bell, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present design. Therefore, the foregoing is considered as illustrative only of the principles of the Bicycle Stem with Integrated Bell. Further, since numerous modifications and changes will readily occur to those skilled in the art, it is not desired to limit the Bicycle stem with Integrated Bell to the exact construction and operation shown and described, and accordingly, all suitable modifications and equivalents may be resorted to falling within the scope of this application.

BRIEF DESCRIPTION OF THE DRAWINGS

The accompanying drawings, which are incorporated in and form a part of this specification, illustrate embodiments of the Bicycle Stem with Integrated Bell 10A, 10B, 10C, 10D, 10E, 10F and 10G together with the description, serve to explain the principles of this application.

FIG. 9A depicts a bottom view of the Bicycle Stem with Integrated Bell 10F illustrating the location of the bell clapper lever and plate with orifice mechanical locking on/off switch mechanism, shown mounted to the bottom surface of the stem frame.

FIG. 9B depicts a sectioned perspective view of the Bicycle Stem with Integrated Bell 10F illustrating a manual lever and plate with orifice mechanical locking on/off switch mechanism, shown mounted to the bottom surface of the stem frame, and further illustrating the ambidextrous on/off switch.

FIG. 9C depicts a perspective view of the manual lever actuated manually operated mechanical on/off switch ambidextrous bell clapper locking mechanism, shown alone and detached from the stem frame.

FIG. 10 depicts a side view of the Bicycle Stem with Integrated Bell 10G having an electronic battery-operated module component with a bell or siren speaker housed within the stem frame.

FIG. 11 depicts a bottom view of the Bicycle Stem with Integrated Bell 10G having the electrical on/off switch module component mounted within the stem frame having optional LED lights.

FIG. 12 depicts a bottom view of the electronic battery operated electrical on/off switch module component removed from the stem frame with the screws in position on the mounting plate to secure the electrical on/off switch module component having optional LED lights.

FIG. 13 depicts a front view of the electronic battery operated electrical on/off switch module component removed from the stem frame and separated from the mounting plate used to secure the electrical on/off switch module component having optional LED lights.

FIG. 14 depicts a cross-sectional side view of the electronic battery operated electrical on/off switch module component illustrating the interior electrical components.

DETAILED DESCRIPTION OF THE PREFERRED EMBODIMENTS

As required, the detailed embodiments of the present Bicycle Stem with Integrated Bell 10A, 10B, 10C, 10D, 10E, 10F and 10G are disclosed herein, however, it is to be understood that the disclosed embodiments are merely exemplary of the prominent design and operational features that may be embodied in various forms. Therefore, specific functional and structural details disclosed herein are not to be interpreted as limiting, but merely as basic for the claims and as a representative basis for teaching one skilled in the art to variously employ the present design in virtually any appropriately detailed structure as well as combination.

Figure 1:
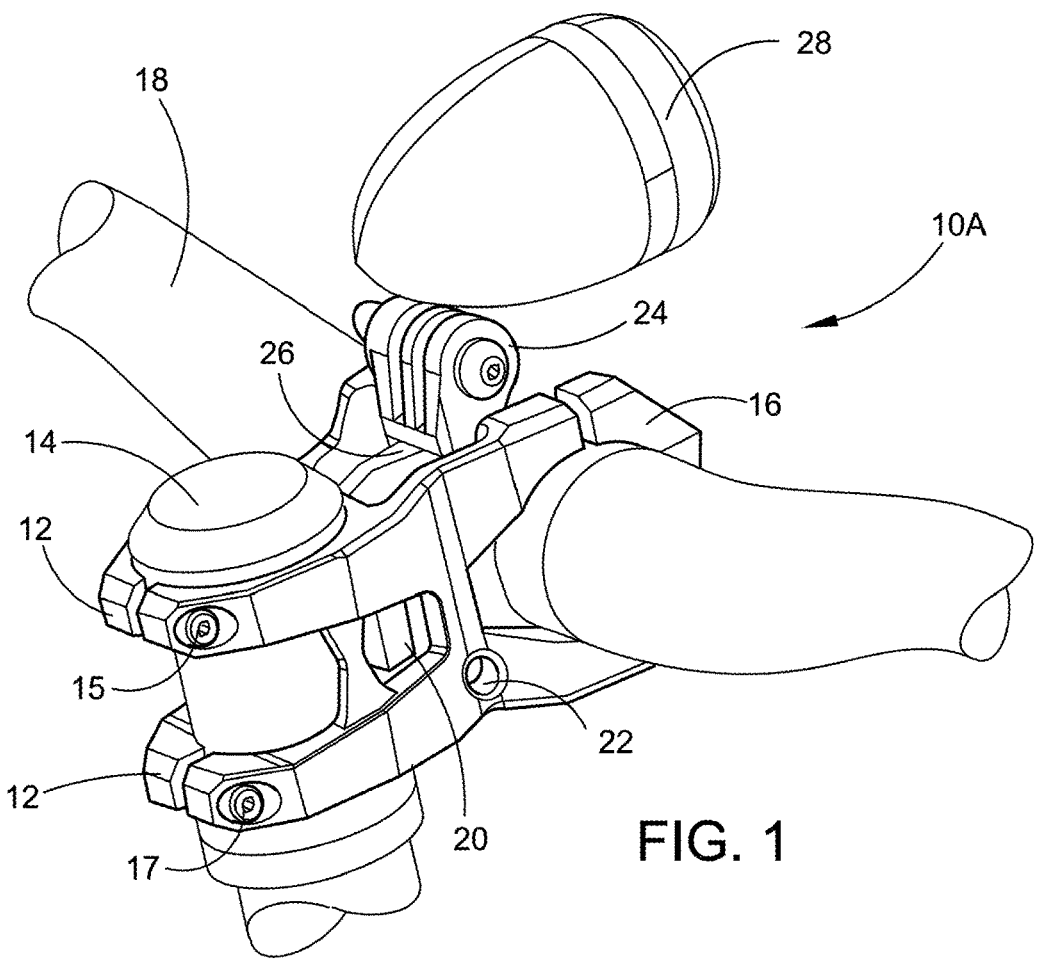
FIG. 1 depicts a perspective view from the side of the Bicycle Stem with Integrated Bell 10A in place on a steering post with attached handlebars, illustrating the position of the removable accessory mount in place secured to the stem frame.

FIG. 1 depicts a perspective view from the side of the Bicycle Stem with Integrated Bell 10A illustrating removeable accessory mount 24 mounted to the top surface of the stem frame 26. A pair of vertical steering post clamping sections 12 are fastened, using cap screws 15 and 17, to the steering post 14 for directional control of the bicycle. The horizontal clamping section 16 is attached to stem frame 26, securing handlebar 18 to the bicycle. An internal bell cavity 20 between the vertical steering post clamping sections 12 and the horizontal handlebar clamping section 16 is where the optional bell (not shown) will be housed. An optional chamfered bell mouthed orifice 22 can be on one or both sides of the Bicycle Stem with Integrated Bell 10A. The removable utility accessory mount 24 will be attached to the upper surface of stem frame 26 having the capability of holding a front light 28, a camera, a smartphone, a GPS or other devices that can be easily removed and replaced by the individual using the desired bicycle accessories.

Figure 2A:
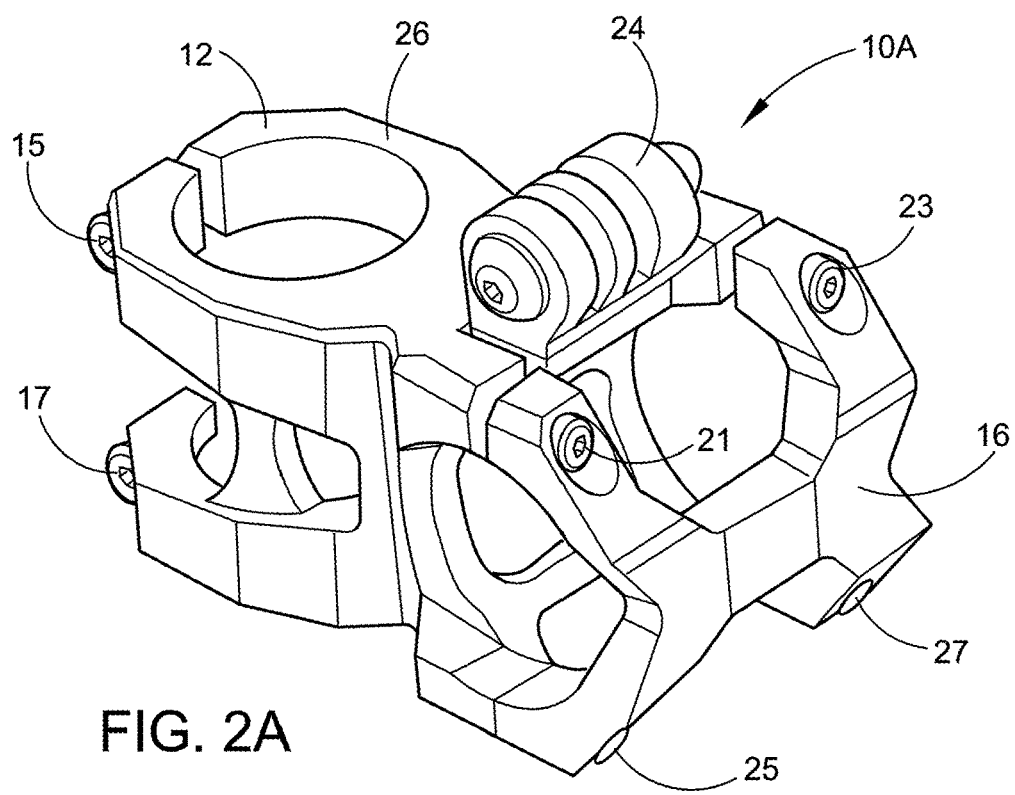
FIG. 2A depicts a perspective front view of the Bicycle Stem with Integrated Bell 10A further illustrating the position of the removable accessory mount in place secured to the stem frame.

FIG. 2A depicts a perspective front view of the Bicycle Stem with Integrated Bell 10A further illustrating the removable accessory mount 24 on the stem frame 26. The vertical steering post clamping sections 12 will be attached to the steering post 14 for directional control of the bicycle. The horizontal handlebar clamping section 16 is attached to stem frame 26, securing handlebar 18 of the bicycle using upper cap screws 21 and 23 and lower cap screws 25 and 27. The removable utility mount 24 will be attached to the upper surface of stem frame 26 having the capability of holding a front light 28, a camera, a smartphone, a GPS or any other devices which then can be easily removed and replaced by the individual using the desired bicycle accessories.

Figure 2B:
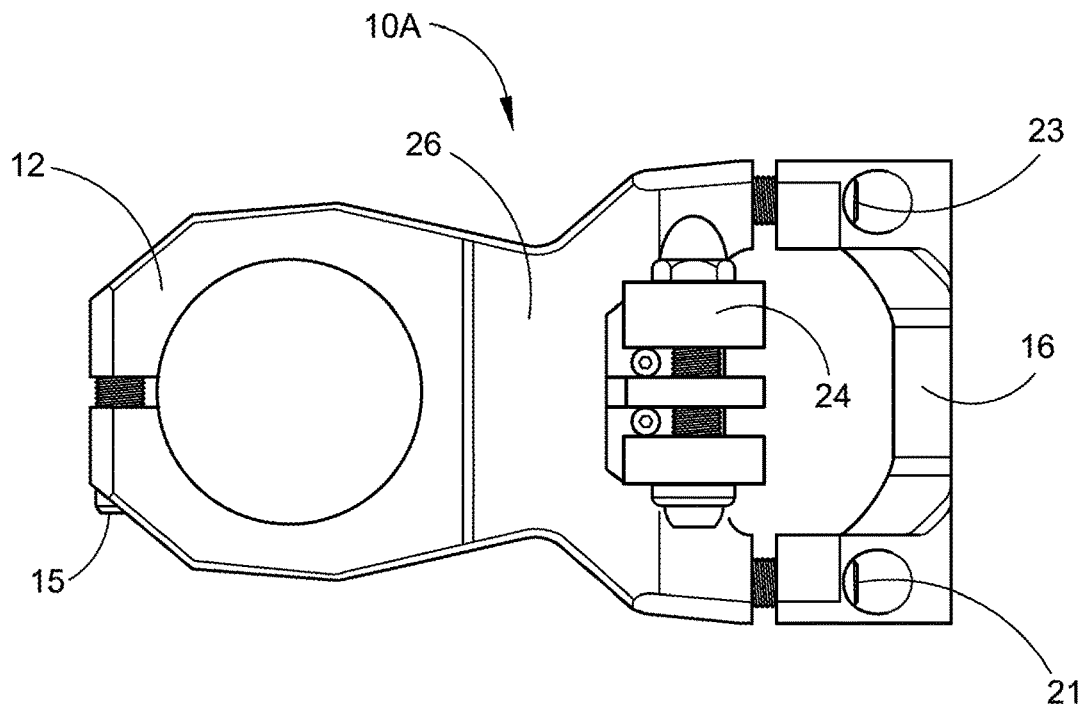
FIG. 2B depicts a top plan view of the Bicycle Stem with Integrated Bell 10A further illustrating the position of the removable accessory mount in place secured to the stem frame.

FIG. 2B depicts a top plan view of the Bicycle Stem with Integrated Bell 10A illustrating the vertical clamping sections 12, the horizontal handlebar clamping section 16 along with the removable utility accessory mount 24 here mounted securely to the top surface of the stem frame 26.

Figure 2C:
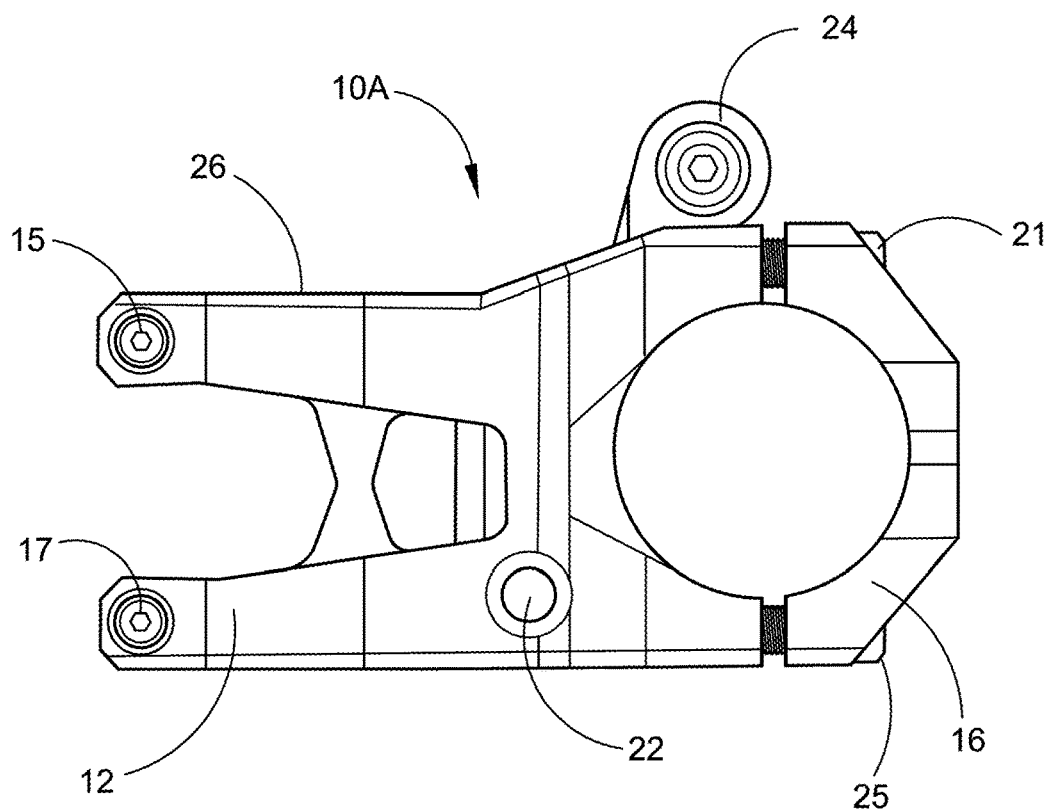
FIG. 2C depicts side view of the Bicycle Stem with Integrated Bell 10A further illustrating the position of the removable accessory mount in place secured to the stem frame.

FIG. 2C depicts side view of the Bicycle Stem with Integrated Bell 10A illustrating the vertical steering post clamping sections 12, the horizontal handlebar clamping section 16, the removable utility accessory mount 24 along with locations of the optional chamfered bell mouthed orifices 22 on either side of the bell housing.

Figure 3:
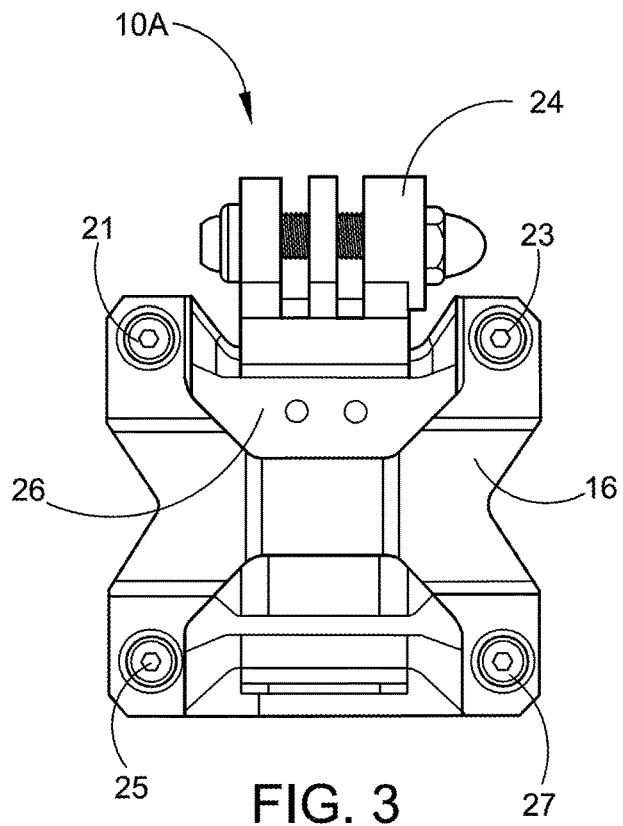
FIG. 3 depicts an end view of the Bicycle Stem with Integrated Bell 10A with the removable utility accessory mount mounted on the top surface of the stem frame.

FIG. 3 depicts a front view of the Bicycle Stem with Integrated Bell 10A with the removable utility accessory mount 24 mounted on the top surface of the stem frame 26 and also showing the horizontal handlebar clamping section 16 held firmly in place by upper cap screws 21 and 23 as well as lower cap screws 25 and 27. It is anticipated that the accessory mount can be of any kind, shown here is a typical bicycle light or GoPro® camera mount.

Figure 4:
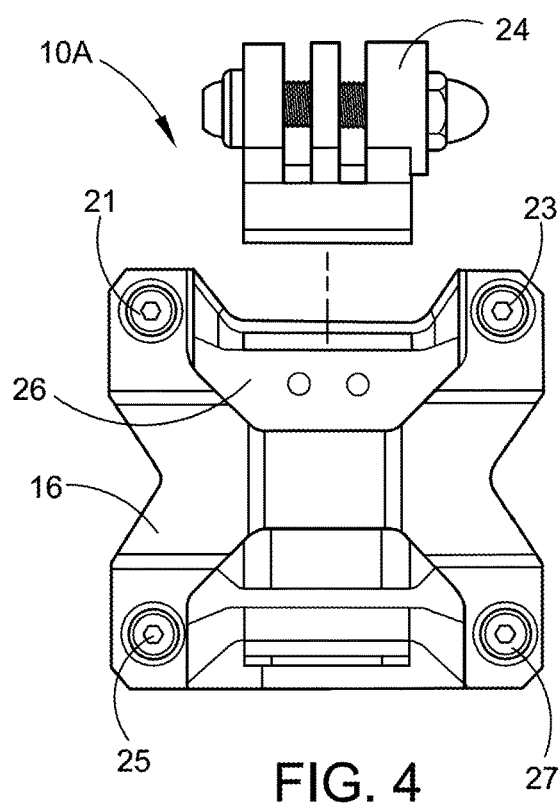
FIG. 4 depicts an end view of the Bicycle Stem with Integrated Bell 10A with the removable utility accessory mount mounted raised above and removed from the top surface mounting section of the stem frame.

FIG. 4 depicts a front view of the Bicycle Stem with Integrated Bell 10A with the removable utility accessory mount 24 removed and raised above the top surface of the stem frame 26 and also showing the horizontal handlebar clamping section 16 held firmly in place by upper cap screws 21 and 23 as well as lower cap screws 25 and 27. The removable utility mount 24 will be attached to the upper surface of stem frame 26 of the Bicycle Stem with Integrated Bell 10A having the capability of holding a bicycle light, a camera, a smartphone, a GPS or any other devices which then can be easily removed and replaced by the individual using the desired bicycle accessories.

Figure 5A:
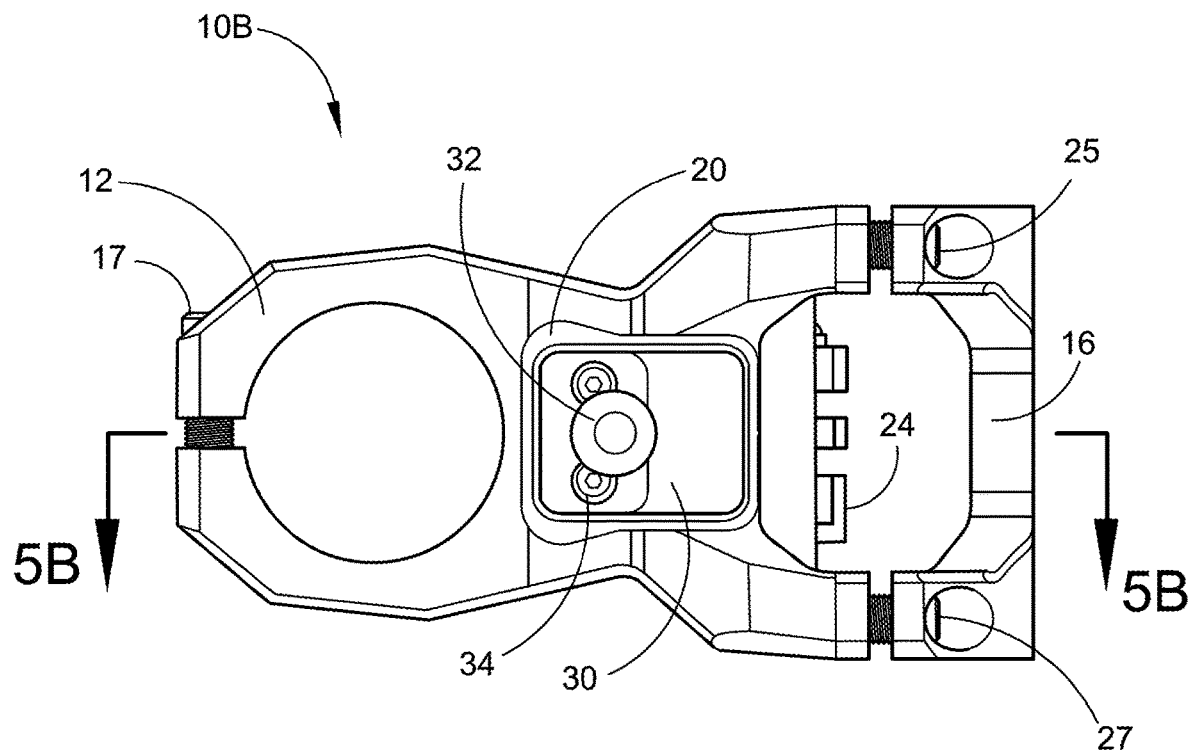
FIG. 5A depicts bottom view of the Bicycle Stem with Integrated Bell 10B illustrating the position of the bell cavity and the bell having a free-swinging clapper therein.

FIG. 5A depicts bottom view of the Bicycle Stem with Integrated Bell 10B illustrating the position of the bell cavity and the bell having a free-swinging clapper therein. Furthermore, FIG. 5A depicts bottom view of the Bicycle Stem with Integrated Bell 10B illustrating the location of the internal bell cavity 20, the bell 30, the free-swinging bell clapper 32 and the bell mounting screws 34. When the bicycle is in motion, the vibration, jostling, and bumping of the bicycle activate the free-swinging bell clapper 32 to ring the bell using gravity.

Figure 5B:
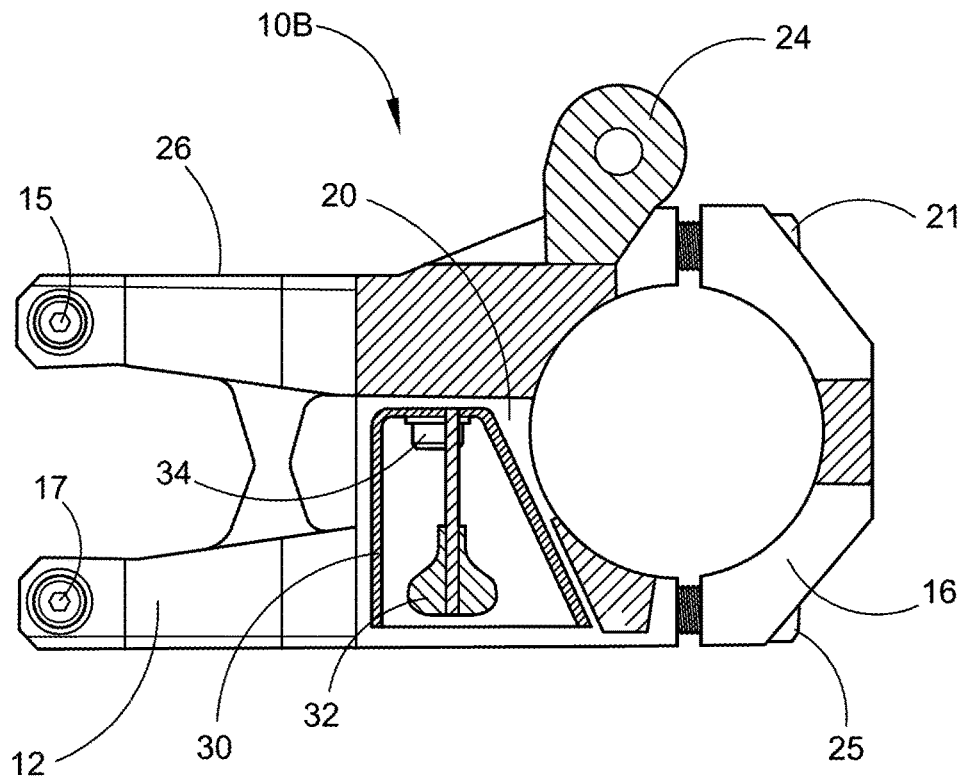
FIG. 5B depicts a partial sectioned side view of the Bicycle Stem with Integrated Bell 10B illustrating the position of the bell cavity and the bell having a free-swinging clapper therein.

FIG. 5B depicts a partial sectioned side view of the Bicycle Stem with Integrated Bell 10B illustrating the position of the bell cavity and the bell having a free-swinging clapper therein. Furthermore, FIG. 5B depicts a partial sectioned side view of the Bicycle Stem with Integrated Bell 10B illustrating the location of the internal bell cavity 20, the bell 30, the free-swinging bell clapper 32 and the bell mounting screws 34. When the bicycle is in motion, the vibration, jostling, and bumping of the bicycle activate the free-swinging bell clapper 32 to ring the bell using gravity.

Figure 6A:
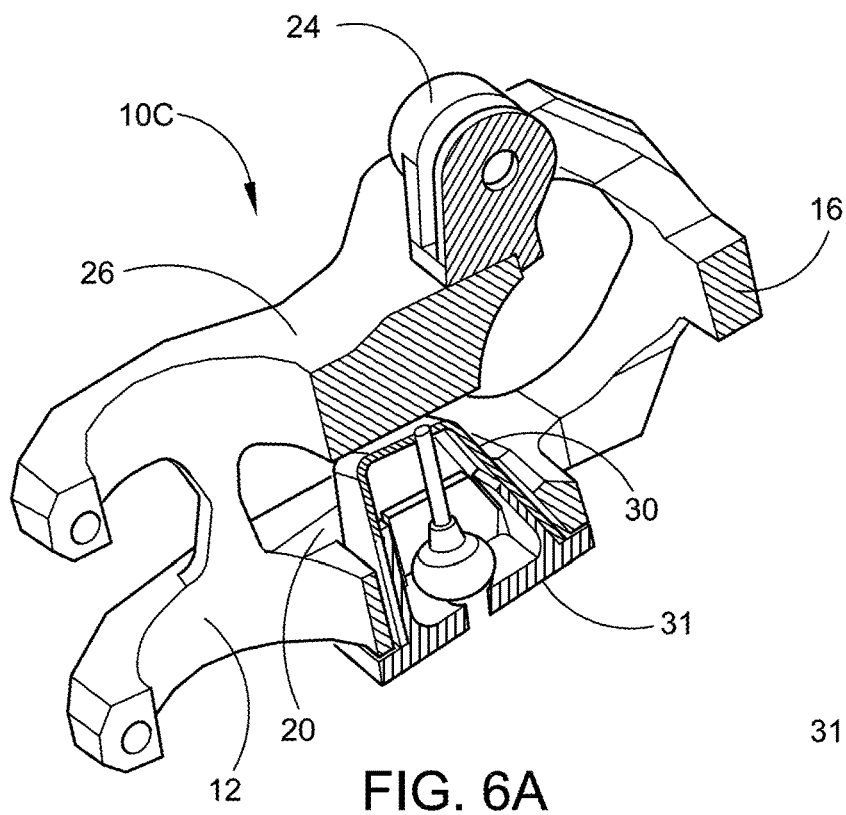
FIG. 6A depicts a partial sectioned perspective view of the Bicycle Stem with Integrated Bell 10C illustrating the position of the bell cavity and the bell having a free-swinging clapper therein, and illustrating the position of the plug used for preventing the clapper from free-swinging.

FIG. 6A depicts a partial sectioned perspective view of the Bicycle Stem with Integrated Bell 10C illustrating the position of the bell cavity and the bell having a free-swinging clapper therein, and illustrating the position of the plug 31 used for preventing the clapper from free-swinging. By inserting plug 31 into the bell cavity, the clapper is prevented from swinging freely and thereby all bell ringing sound is halted.

Figure 6C:
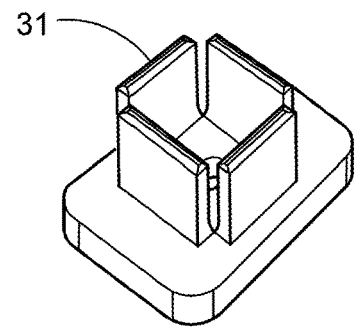
FIG. 6C depicts a plug used to insert into the bell cavity for preventing the clapper from free-swinging.
Figure 6B:
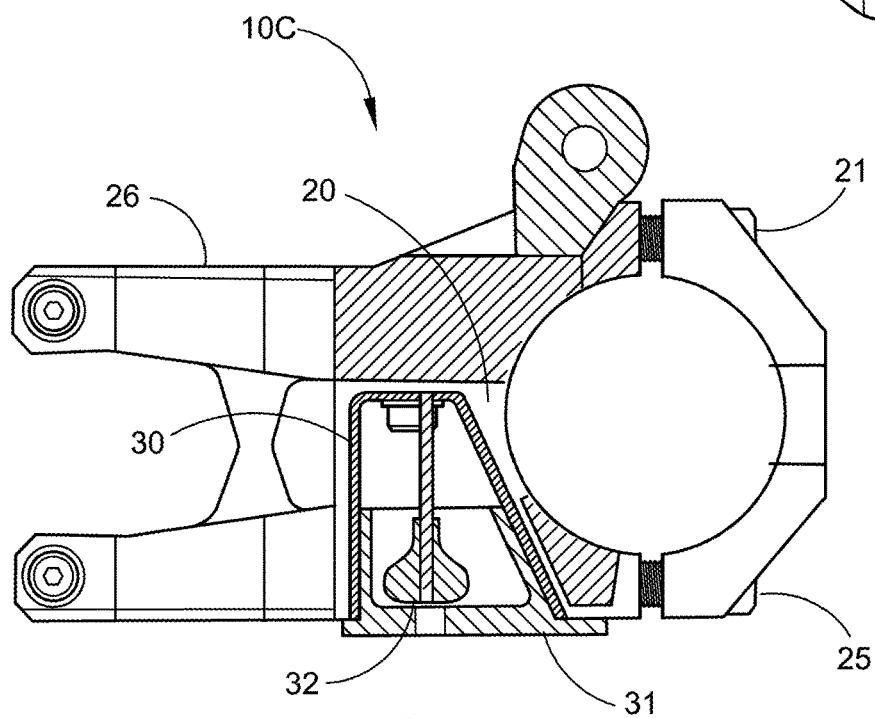
FIG. 6B depicts a partial sectioned side view of the Bicycle Stem with Integrated Bell 10C illustrating the position of the bell cavity and the bell having a free-swinging clapper therein, and illustrating the position of the plug used for preventing the clapper from free-swinging.

FIG. 6B depicts a partial sectioned side view of the Bicycle Stem with Integrated Bell 10C illustrating the position of the bell cavity 20 and the bell 30 having a free-swinging clapper 32 therein, and illustrating the position of the plug 31 used for preventing the clapper from free-swinging.

FIG. 6C depicts a plug 31 used to insert into the bell cavity for preventing the clapper from free-swinging. The plug 31 can be made of rubber or plastic, or any natural or synthetic material and flexes as it is pushed securely into the bell cavity 20.

Figure 7A:
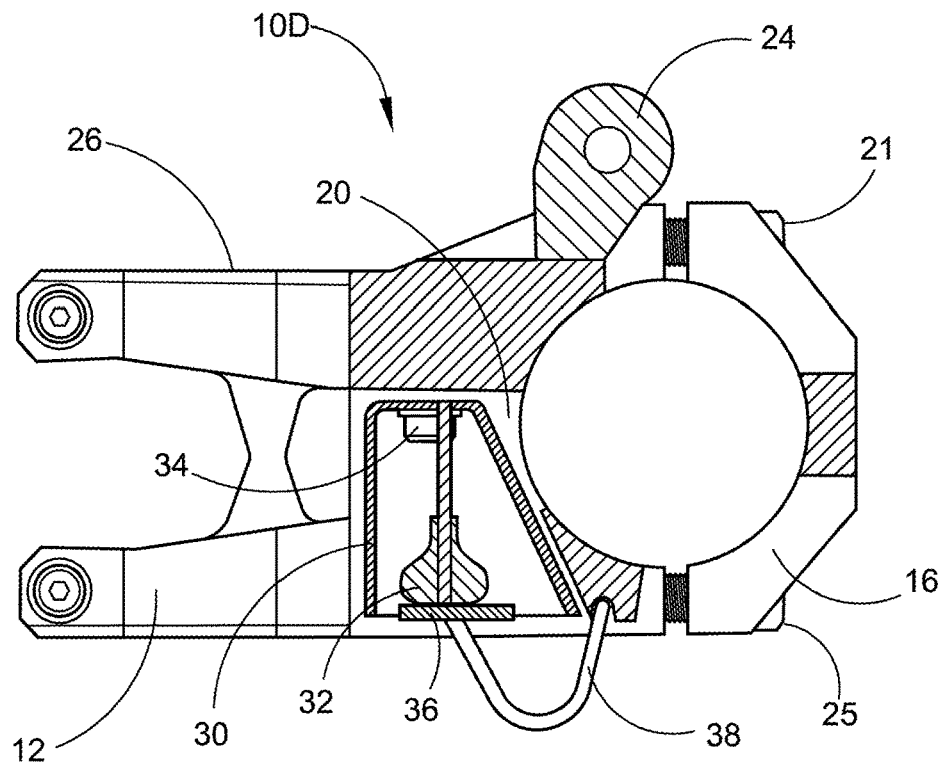
FIG. 7A depicts a partially sectioned side view of the Bicycle Stem with Integrated Bell 10D additionally illustrating the location of the internal bell cavity and having a magnetic clapper on/off switch mechanism shown in the off position.

FIG. 7A depicts a partial sectioned side view of the Bicycle Stem with Integrated Bell 10D further illustrating the location of the internal bell cavity 20 with bell 30 attached by the means of the bell mounting screws 34. The bell clapper 32 is held in a stationary position by the means of a magnetic plate 36 on the end of a rotatable swivel member 38 as a means of preventing the free-swinging bell clapper 32 from swinging freely and thereby silencing the bell 30. The magnetic plate 36 can be a natural earth magnet, or any other kind of magnetic materials, and the bell clapper 32 would be constructed using ferrous metal materials.

Figure 7B:
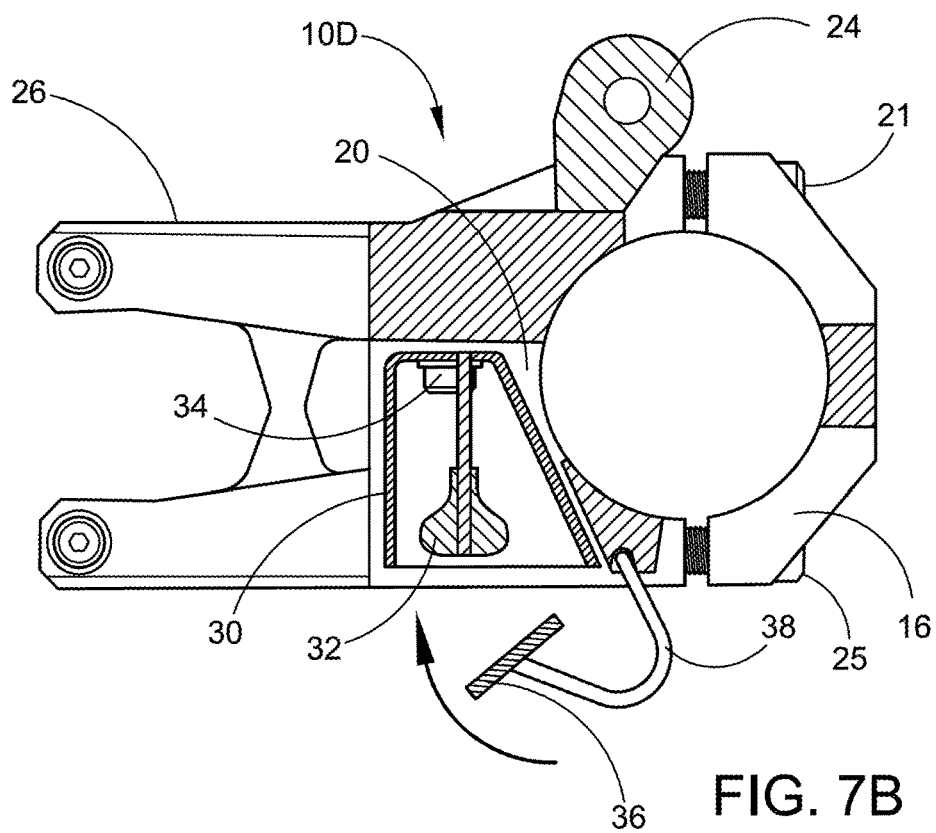
FIG. 7B depicts a partially sectioned side view of the Bicycle Stem with Integrated Bell 10D additionally illustrating the location of the internal bell cavity and having a magnetic clapper on/off switch mechanism shown in the on position.

FIG. 7B depicts a partially sectioned side view of the Bicycle Stem with Integrated Bell 10D additionally illustrating the location of the internal bell cavity 20 with bell 30 attached by the means of the bell mounting screws 34. The bell clapper 32 is held in a free position with the magnet 36 on the end of a rotatable swivel member 38 moved away allowing the bell clapper 32 to swing freely.

Figure 8A:
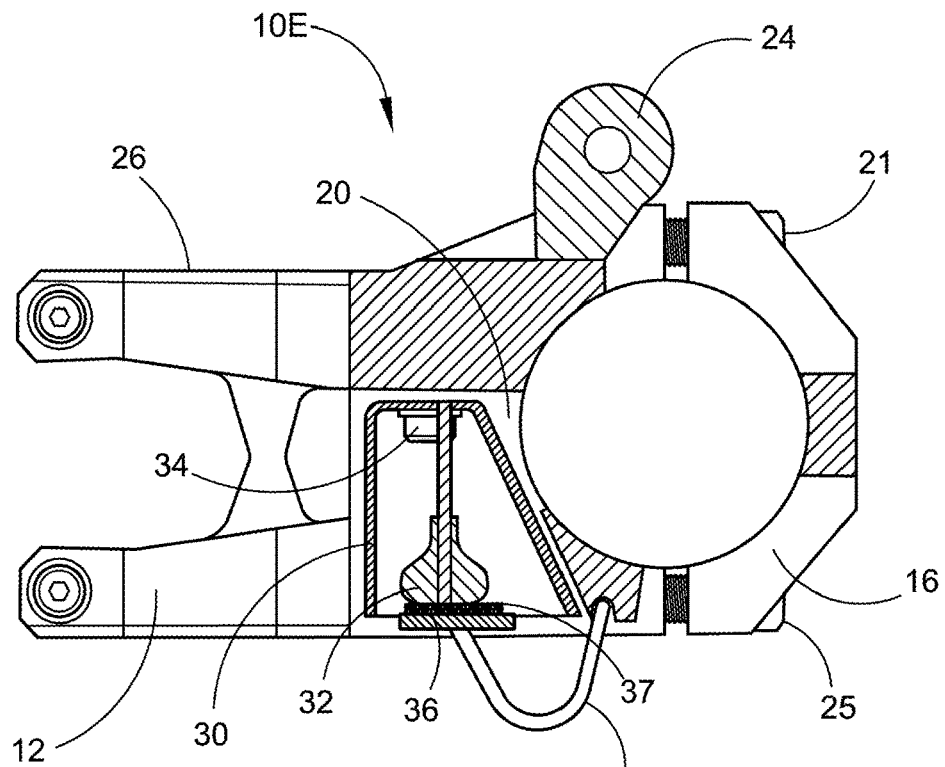
FIG. 8A depicts a partially sectioned side view of the Bicycle Stem with Integrated Bell 10E additionally illustrating the location of the internal bell cavity and having a hook and loop lined plate and hook and loop lined bell clapper on/off switch mechanism shown in the off position.

FIG. 8A depicts a partially sectioned side view of the Bicycle Stem with Integrated Bell 10E additionally illustrating the location of the internal bell cavity 20 and having a hook and loop 37 lined plate 36 and a hook and loop 37 lined bell clapper 32 for an on/off switch mechanism, here shown in the off position.

Figure 8B:
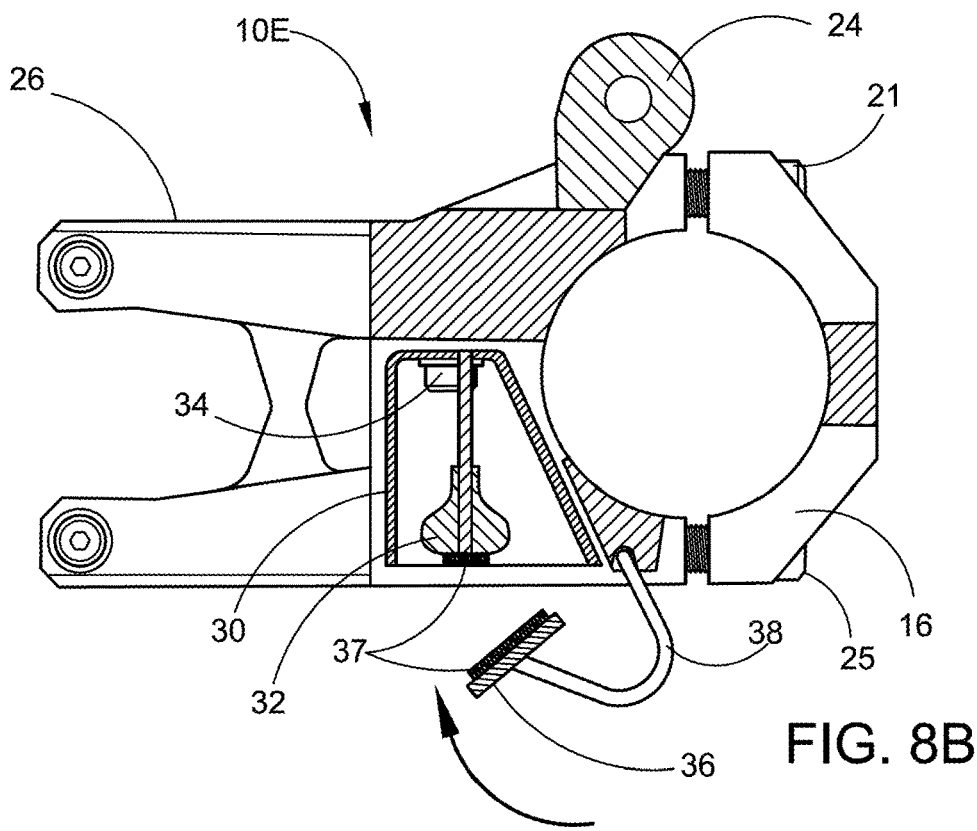
FIG. 8B depicts a partially sectioned side view of the Bicycle Stem with Integrated Bell 10E additionally illustrating the location of the internal bell cavity and having a hook and loop lined plate and hook and loop lined bell clapper on/off switch mechanism shown in the on position.

FIG. 8B depicts a partially sectioned side view of the Bicycle Stem with Integrated Bell 10E additionally illustrating the location of the internal bell cavity 20 and having a hook and loop 37 lined plate 36 and a hook and loop 37 lined bell clapper 32 for an on/off switch mechanism, here shown in the on position.

FIG. 9A depicts a bottom view of the Bicycle Stem with Integrated Bell 10F illustrating the location of the manual actuated lever and plate with orifice mechanical locking on/off switch mechanism assembly 40, shown mounted to the bottom surface of the stem frame 26. The bell clapper locking mechanism 40 pinches against the side of the bell 30 to stop it from ringing. The locking plate 42 pinches against the inner surface of the bell 30 with the distal end 44 to stop the ringing bell. The clapper 32 is pinched and cradled within the square cavity 46 in the in the locking plate 42 by the means of rotating the levers 48 at the ends locking shaft 50. In this way, the on/off switch is manually operated by the bicycle rider.

FIG. 9B depicts a sectioned perspective view of the Bicycle Stem with Integrated Bell 10F illustrating a manual actuated lever and plate with orifice mechanical locking on/off switch mechanism assembly 40, shown mounted to the bottom surface of the stem frame 26, and further illustrating the ambidextrous on/off switch levers 48. The bell clapper locking mechanism assembly 40 pinches bell clapper 32 against the inside of the bell 30 with the distal end 44 to stop it from ringing. The Bell clapper 32 is pinched and cradled within the square cavity 46 in the in the locking plate 42 by the means of rotating the levers 48 at the ends of locking axle shaft 50. The levers are on both sides of the mechanism assembly 40 making it an ambidextrous on/off actuated manually operated switch.

FIG. 9C depicts a perspective view of the bell clapper locking mechanism assembly 40 with the locking plate 42 having a forked distal end 44 and with the square cavity orifice 46 centrally located on the locking axle shaft 50 with dual levers 48 located on each of the distal ends.

FIG. 10 depicts a side view of the Bicycle Stem with Integrated Bell 10G having an electronic battery-operated component 56 with a bell or siren circuit board and speaker with a continuous sound capability, or when the cyclist presses the on/off/or intermittent control button 58 the sound is intermittent or turned off. The electronic battery-operated component 56 is secured in position by the means of screws 60 (shown in FIG. 11) in the mounting plate 62. Optional LED lights (not shown in FIG. 10) may be placed on either side of the Bicycle Stem with Integrated Bell 10C.

FIG. 11 depicts a bottom view of the Bicycle Stem with Integrated Bell 10G having optional LED lights 64 and with a bell or siren with a continuous sound capability, or when the cyclist presses the on/off/or intermittent control button 58 the sound is intermittent or turned off. The electronic battery-operated component 56 is secured in position by the means of screws 60 in the mounting plate 62. Optional LED lights 64 are illustrated on either side of the Bicycle Stem with Integrated Bell 10C.

FIG. 12 is a bottom view illustration of the electronic battery-operated component 56 with the screws 60 in position on the mounting plate 62. The LED lights 64 project outwardly from the sides of the electronic battery-operated component 56.

FIG. 13 is a partially exploded view illustration of the electronic battery-operated component 56 with the mounting plate 62 exploded away and the LED lights 64 project outwardly from the sides.

FIG. 14 is a cross-sectional side view of the electronic battery-operated component 56 with the screws 60 in the mounting plate 62 along with the intermittent/on/off control button 58. The internal components of the electronic battery-operated component 56 will consist of a printed circuit board 68, a speaker 70 and one or more batteries 72 to provide power to the electrical components. The printed circuit board 68 is activated by the on/off switch 58 and the speaker emits the bell or siren sound programmed into the electronic battery-operated component 56.

The Bicycle Stem with Integrated Bell 10A, 10B, 10C, 10D, 10E, 10F and 10G shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing the Bicycle Stem with Integrated Bell 10A, 10B, 10C, 10D, 10E, 10F and 10G in accordance with the spirit of this disclosure, and such changes, alternations and modifications as would occur to those skilled in the art are considered to be within the scope of this design as broadly defined in the appended claims.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. For example, one portion of one of the embodiments described herein can be substituted for another portion in another embodiment described herein. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Further, the purpose of the foregoing abstract is to enable the U.S. Patent and Trademark Office, foreign patent offices worldwide and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. A bicycle stem, comprising:
  (a) a stem frame having an upper surface and a lower surface a front section and a rear section, a right side surface, and a left side surface;
  (b) a steering post clamping section located at the rear section of said stem frame for the purpose of securing a steering post to said stem frame rear section;
  (c) a handlebar clamping section located at the front section of said stem frame for the purpose of securing a handlebar, at a 90 degree angle to said secured steering post, to said stem frame front section; and
  (d) an integrated internal bell accepting cavity located in the lower surface of said stem frame;
  wherein said stem frame having an integrated internal bell accepting cavity located in the lower surface of said stem frame is capable of accepting a bell housing.

2. The bicycle stem according to claim 1, wherein said stem frame having an integrated internal bell accepting cavity located in the lower surface of said stem frame includes a bell housing and free-swinging bell clapper mounted therein.

3. The bicycle stem according to claim 2, wherein said stem frame having an integrated internal bell accepting cavity located in the lower surface of said stem frame includes a bell housing and free-swinging bell clapper mounted therein, and further includes a manually operated on/off sound control switch in the form of a removeable and replaceable plug, which when inserted into said bell cavity stops the free-swinging bell clapper from swinging and thereby stops sound from being emitted from the bell housing.

4. The bicycle stem according to claim 2, wherein said stem frame having an integrated internal bell accepting cavity located in the lower surface of said stem frame includes a bell housing and free-swinging bell clapper mounted therein, and further includes a manually operated on/off sound control switch in the form of a removeable and replaceable magnetic plate, which when moved into proximity of the bell clapper, stops the free-swinging bell clapper from swinging by magnetic attraction and thereby stops sound from being emitted from the bell housing.

5. The bicycle stem according to claim 2, wherein said stem frame having an integrated internal bell accepting cavity located in the lower surface of said stem frame includes a bell housing and free-swinging bell clapper mounted therein, and further includes a manually operated on/off sound control switch in the form of a removeable and replaceable hook and loop material lined plate and a hook and loop lined bell clapper, which when moved into proximity of the hook and loop lined bell clapper, affixes to the bell clapper and stops the free-swinging bell clapper from swinging and thereby stops sound from being emitted from the bell housing.

6. The bicycle stem according to claim 2, wherein said stem frame having an integrated internal bell accepting cavity located in the lower surface of said stem frame includes a bell housing and free-swinging bell clapper mounted therein, and further includes a manually operated on/off sound control switch in the form of a removeable and replaceable lever, axle and plate with orifice assembly, which when moved into proximity of the free-swinging bell clapper, traps the bell clapper and stops the free-swinging bell clapper from swinging and thereby stops sound from being emitted from the bell housing.

7. The bicycle stem, according to claim 6, wherein said manually operated on/off sound control switch further includes two ambidextrous on/off levers rotatable around said axle to allow a user to manually switch the bell clapper on and off with either the left or right hand.

8. The bicycle stem according to claim 1, wherein said stem frame having an integrated internal bell accepting cavity located in the lower surface of said stem frame includes a removeable and replaceable electronic bell and siren module having a circuit board, a speaker, a battery and an electronic on/off switch.

9. The bicycle stem according to claim 8, wherein said removeable and replaceable electronic bell and siren module further includes one or more LED indicator lights mounted thereon and further wherein said one or more LED indicator lights are visible on the exterior of said bicycle stem.

10. A method for making a bicycle stem, comprising the steps of:
(a) providing a stem frame having an upper surface and a lower surface a front section and a rear section, a right side surface, and a left side surface;
(b) providing a steering post clamping section located at the rear section of said stem frame for the purpose of securing a steering post to said stem frame rear section;
(c) providing a handlebar clamping section located at the front section of said stem frame for the purpose of securing a handlebar, at a 90 degree angle to said secured steering post, to said stem frame front section; and
(d) providing an integrated internal bell accepting cavity located in the lower surface of said stem frame;
wherein said stem frame having an integrated internal bell accepting cavity located in the lower surface of said stem frame is capable of accepting a bell housing.

11. The method for making a bicycle stem according to claim 10, wherein said stem frame having an integrated internal bell accepting cavity located in the lower surface of said stem frame includes a bell housing and free-swinging bell clapper mounted therein.

12. The method for making a bicycle stem according to claim 11, wherein said stem frame having an integrated internal bell accepting cavity located in the lower surface of said stem frame includes a bell housing and free-swinging bell clapper mounted therein, and further includes a manually operated on/off sound control switch in the form of a removeable and replaceable plug, which when inserted into said bell cavity stops the free-swinging bell clapper from swinging and thereby stops sound from being emitted from the bell housing.

13. The method for making a bicycle stem according to claim 11, wherein said stem frame having an integrated internal bell accepting cavity located in the lower surface of said stem frame includes a bell housing and free-swinging bell clapper mounted therein, and further includes a manually operated on/off sound control switch in the form of a removeable and replaceable magnetic plate, which when moved into proximity of the bell clapper, stops the free-swinging bell clapper from swinging by magnetic attraction and thereby stops sound from being emitted from the bell housing.

14. The method for making a bicycle stem according to claim 11, wherein said stem frame having an integrated internal bell accepting cavity located in the lower surface of said stem frame includes a bell housing and free-swinging bell clapper mounted therein, and further includes a manually operated on/off sound control switch in the form of a removeable and replaceable hook and loop material lined plate and a hook and loop lined bell clapper, which when moved into proximity of the hook and loop lined bell clapper, affixes to the bell clapper and stops the free-swinging bell clapper from swinging and thereby stops sound from being emitted from the bell housing.

15. The method for making a bicycle stem according to claim 11, wherein said stem frame having an integrated internal bell accepting cavity located in the lower surface of said stein frame includes a bell housing and free-swinging bell clapper mounted therein, and further includes a manually operated on/off sound control switch in the form of a removeable and replaceable lever, axle and plate with orifice assembly, which when moved into proximity of the free-swinging bell clapper, traps the bell clapper and stops the free-swinging bell clapper from swinging and thereby stops sound from being emitted from the bell housing.

16. The method for making a bicycle stem, according to claim 15, wherein said manually operated on/off sound control switch further includes two ambidextrous on/off levers rotatable around said axle to allow a user to manually switch the bell clapper on and off with either the left or right hand.

17. The method for making a bicycle stem according to claim 10, wherein said stem frame having an integrated internal bell accepting cavity located in the lower surface of said stem frame includes a removeable and replaceable electronic bell and siren module having a circuit board, a speaker, a battery and an electronic on/off switch.

18. The method for making a bicycle stem according to claim 17, wherein said removeable and replaceable electronic bell and siren module further includes one or more LED indicator lights mounted thereon and further wherein said one or more LED indicator lights are visible on the exterior of said bicycle stem.

19. A bicycle stem, comprising:
(a) a stem frame having a front section and a rear section, an upper surface, a lower surface, a right side surface, and a left side surface;

(b) a steering post clamping section located at the rear section of said stem frame for the purpose of securing a steering post to said stem frame;
(c) a handlebar clamping section located at the front section of said stem frame for the purpose of securing a handlebar, at a 90 degree angle to said secured steering post, to said stem frame;
(d) an accessory accepting mounting section located on the upper surface of said stem frame; and
(e) an accessory mount;
wherein said accessory accepting mounting section removably and replaceably accepts said accessory mount.

20. A method for making a bicycle stem, comprising the steps of:
(a) providing a stem frame having a front section and a rear section, an upper surface, a lower surface, a right side surface, and a left side surface;
(b) providing a steering post clamping section located at the rear section of said stem frame for the purpose of securing a steering post to said stem frame;
(c) providing a handlebar clamping section located at the front section of said stem frame for the purpose of securing a handlebar, at a 90 degree angle to said secured steering post, to said stem frame;
(d) providing an accessory accepting mounting section located on the upper surface of said stem frame; and
(e) providing an accessory mount;
wherein said accessory accepting mounting section removably and replaceably accepts said accessory mount.

* * * * *